(12) United States Patent
McPherson et al.

(10) Patent No.: US 6,239,728 B1
(45) Date of Patent: May 29, 2001

(54) DUAL RATE ENCODING SCHEME AND APPARATUS USING THE SAME

(75) Inventors: Alan J. McPherson, Chatsworth; Gregory B. Thagard, Los Angeles, both of CA (US)

(73) Assignee: Warner Music Group, Inc., Olyphant, PA (US)

( * ) Notice: Subject to any disclaimer, the term of this patent is extended or adjusted under 35 U.S.C. 154(b) by 0 days.

(21) Appl. No.: 09/704,878

(22) Filed: Nov. 2, 2000

Related U.S. Application Data

(62) Division of application No. 09/481,142, filed on Jan. 12, 2000.

(51) Int. Cl.[7] .................................................. H03M 7/00
(52) U.S. Cl. ............................................. 341/61; 382/232
(58) Field of Search ................................. 341/61, 51, 67, 341/76, 143, 175, 173; 382/232; 371/37; 358/133; 386/81, 123; 395/140

(56) References Cited

U.S. PATENT DOCUMENTS

| | | | |
|---|---|---|---|
| 4,477,903 | * 10/1984 | Schouhamer Immink et al. ... | 371/37 |
| 4,567,518 | * 1/1986 | Driessen ................................. | 358/133 |
| 5,371,842 | * 12/1994 | Easton et al. ........................ | 395/140 |
| 5,438,635 | * 8/1995 | Richards ............................... | 382/232 |

* cited by examiner

*Primary Examiner*—Brian Young
*Assistant Examiner*—John Nguyen
(74) *Attorney, Agent, or Firm*—Gottlieb, Rackman & Reisman, P.C.

(57) ABSTRACT

An analog signal, for example in a sound recording process, is converted into an input series of digital signals and is then encoded using a special differential encoding scheme. The scheme involves generating two series of signals, one series corresponding to some of the terms of the input signals, while other terms of the input series are excluded. For example the first series may include every second term of the input series. The second series includes terms corresponding to a difference between at least two terms of the input series, at least one of which is not included in the first series. Preferably the two terms of the input series defining a term of the second series are sequential or at most separated by one other term. The two series can be combined and can be either transmitted to a receiver or recorded on a medium. A high quality output is then obtained by reconstructing the input series from the two series. Alternatively, allow quality output is generated by using the first series and only some of the terms (if any) if the second series.

5 Claims, 3 Drawing Sheets

DUAL RATE ENCODING SCHEME AND APPARATUS USING THE SAME

This application is a divisional of Ser. No.09/481,142 filed Jan. 12, 2000.

BACKGROUND OF THE INVENTION

A. Field of Invention

This invention pertains to a method and apparatus for encoding data at one of several data rates and more particularly to a method and apparatus which allows the data so encoded to be decoded at two or more rates. The scheme or method and apparatus is particularly useful in the transmission and storage of audio or video information.

B. Description of the Prior Art

Audio programs are often transmitted or recorded as digital data by converting the analog signals. In order to achieve high quality sound a sampling rate is used to sample the analog signal being transmitted or recorded and a high number of bits is used to represent each sample. For example, for CD recordings, or CD quality signal transmissions, sampling rates of up to 96 KHz and 192 KHz are used and each sample is converted to 20–24 bits. One disadvantage of this process is that, in some instances, a high quality sound may not be desired by the customer or his equipment may not be capable a replaying efficiently enough and a low sampling rate of 32 or 48 KHz and an A/D conversion rate of 8–16 bits/sample may be sufficient. Therefore, much of the data produced by the high quality conversion is unnecessary. Therefore it is desirable to have an encoding scheme which allows the transmittal or recording of signals at a very high quality, but which also allows these signals to be received or playback selectively either at the same high quality as they were transmitted or recorded, or at a lower quality.

A further disadvantage of existing encoding schemes is that they are highly inefficient and hence require a high band width to transmit or record unless complex compression algorithms are used.

OBJECTIVES AND SUMMARY OF THE INVENTION

Therefore it is an objective of the present invention to provide an encoding scheme for encoding signals sampled at a high sampling rate such that the encoded signals can be decoded selectively at several different effective rates.

A farther objective of the present invention to provide an encoding method which automatically compresses the signals as well, thereby requiring less bandwidth than prior art encoding schemes.

A further objective is to provide an encoding scheme and apparatus which can encode a series of signals into encoded signals on two or more channels that are self-clocking.

Yet a further objective is to provide a single apparatus which can record signals at several different rates and sound qualities simultaneously from a high quality single source.

A further objective is to provide a data transmission and or recording device using an encoding scheme which allows the encoded data to be only partially decoded or read, to generate a lower quality sound.

Other objectives and advantages of the invention shall become apparent from the following description. Briefly, an analog signal is encoded in accordance with this invention by sampling said signal at a relatively high sampling rate and converting the samples into a series of digital signals. A differential encoding process is then used to generate an encoded series consisting of every n-th signal of the original series and intermediate signals which are determined from the difference of some of the original signals. In its simplest form, the encoding scheme converts a series A of digital signals A1, A2, A3, into two series A' and B. Series A' consists of every second term of the original series, such as A1, A3, A5 .... The second series B consists of intermediate terms B1, B2, B3 wherein each term is related to the difference between one term of the series A' and one term of the original series A which is not present in series A'. For example, B1=A1-A2, B2=A3-A4 and so on. The two series A,' B can be interleaved, or can be transmitted or recorded on separate channels.

The signals encoded by the inventive scheme can be recorded or can be transmitted to one or more receiving stations by broadcasting and other similar means. At each receiver, or to play the signals back from a recorded medium, the original signal can be accurately reconstructed by generating the original series A from series A' and B. Alternatively, a lower quality signal may be generated by omitting at least some of the signals of series B.

DETAILED DESCRIPTION OF THE INVENTION

Figures 1, 2:
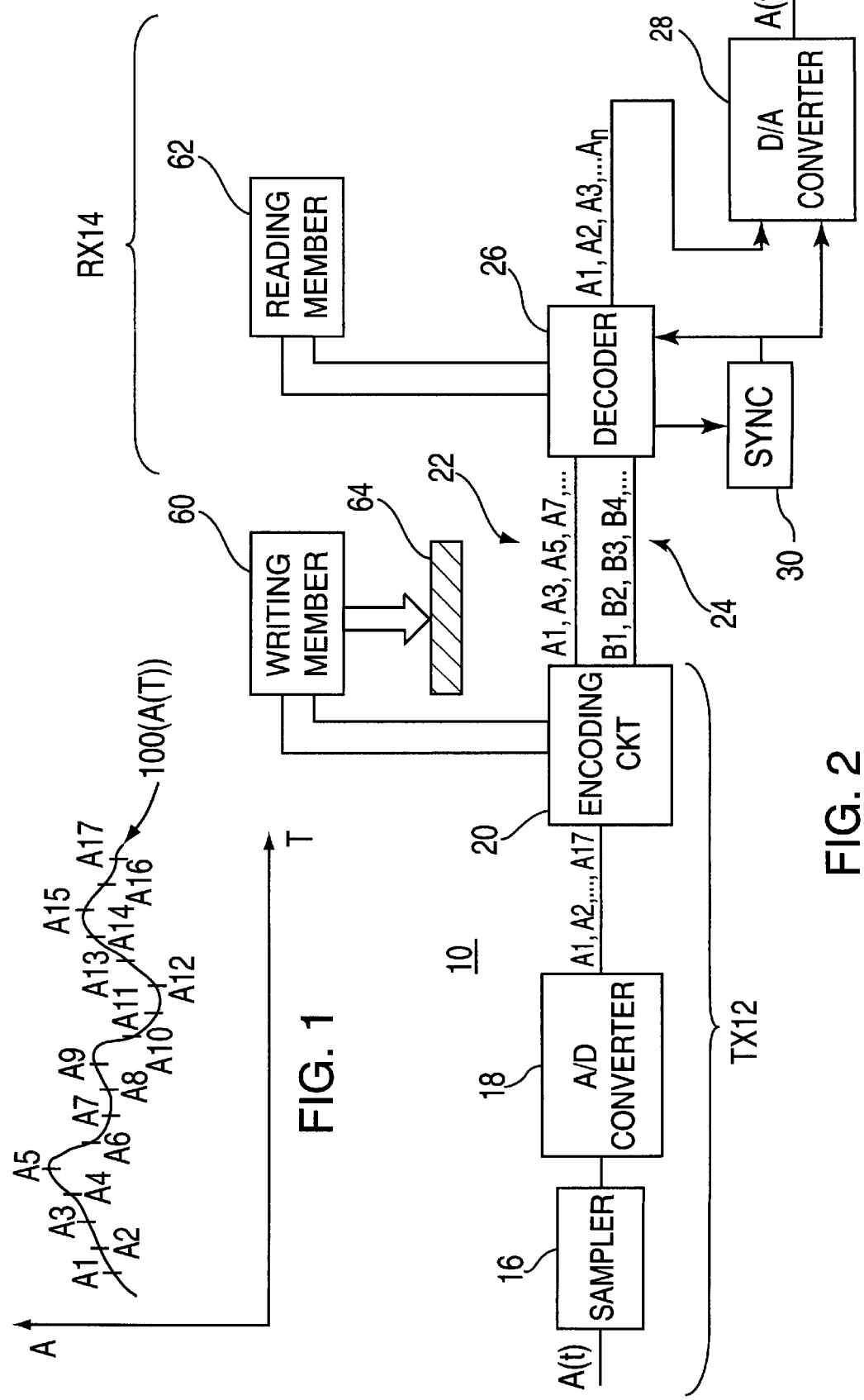
FIG. 1 shows a typical analog signal being sampled.
FIG. 2 shows a block diagram of an apparatus using the subject encoding schemes.
Figure 3:
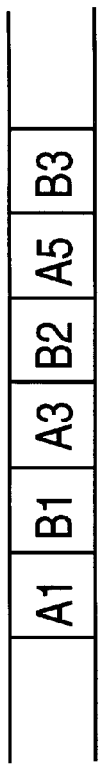
FIG. 3 shows an interleaved transmission sequence in accordance with this invention wherein signals from two series are interleaved.

Referring first to FIG. 1, in order to transmit or store digitally an analog signal 100 (which may be represented as a time-variant function A(t)), the signal is sampled, preferably at regular intervals. The accuracy of the conversion depends on the sampling rate and the a/d conversion sensitivity used. A larger the sampling rate used and a larger sensitivity (i.e. the number of bits for each sample) result in more accurate rendition of the signal A(t), however, also results in large data blocks, as well and requires complex encoding and decoding schemes and filtering circuitry. Moreover, in many instances, the receiving equipment (in case of transmissions) and the playback apparatus (in case of data storage) does not need a high accuracy. Therefore, in the present invention, an encoding scheme is presented which allows the encoded data to be decoded at different effective rates.

Referring first to FIG. 2, in one embodiment an apparatus 10 for transmitting information is disclosed having a transmitter 12 and a receiver 14. In the transmitter 12, analog signal A(t) is fed to a sampler circuit 16. The sampler circuit 16 samples the signal at a predetermined frequency. The samples provided by the sampler 16 are fed to an A/D converter 18 which produces a series of signals A1, A2, A3 .... An. Each signal corresponding to a sample taken by the sample 16. These signals are fed to an encoding circuit 20 which generates two corresponding series of signals. The first series of signals A' comprises every second signal of the original series, i.e. A'=A1, A3, A5 . . . . The second series of signals B corresponds to the difference between one of the signals of the first series A' and one of the signals found in original series A but missing from A'. For example:

B1=A1–A2;

B2=A3–A4;

B3=A5–A6 . . .

The two series of signals A', B are sent to the receiver on two different channels 22, 24. Alternatively, the two series A', B can be interleaved so that they can be sent on a single channel. The interleaved transmitted series in the form:

A1 B1 A3 B2 A5 B3 A7 B4 . . . .

At the receiver 14, the signals from the two channels 22, 24, are fed to a decoder 26. Decoder 26 uses the two series to reconstruct the original series A by generating the missing (in this case, even) terms thereof, i.e.:

A2=A1–B1;

A4=A3–B2;

A6=A5–B3 . . . .

It is clear that this decoding requires relatively little computational power and therefore it can be accomplished very quickly and easily. Once the original series A is reconstructed, it is fed to a D/A decoder to generate the original signal A(t). Signal A(t) can be played for the user. Alternatively the series A of digital terms is used in further processing steps.

The encoding scheme described so far has a number of advantages. First, because the difference between adjacent signals, such as A2 and A3 in FIG. 1, is relatively small as compared to the overall amplitude of these signals, generally the terms B1, B2, B3 of the B series are also small. Accordingly the interleaved transmitted series of FIG. 2 can be transmitted more efficiently since it is automatically compressed.

A further advantage of the scheme is that if several members of either or both series are missing, or corrupted the remaining members can be used to reconstruct the original signal without any difficulty. For example, if A3 is missed, A4 cannot be lost. However, once 15 is received A6 and all future terms of A are easily-obtained since only A4 depends on A3.

Another advantage of the encoding scheme is that in the case of the interleaved transmission of FIG. 2 the encoding is self-synchronizing. More specifically, receiver 14 can include a sync circuit 30. The sync circuit 30 analyzes the signals A1, B1, A3, B2, A5, B3 . . . . As previously mentioned, statistically the B terms of this series are substantially smaller than the A terms. Therefore by analyzing a predetermined number of terms of the series., for example, the synchronizing circuit 30 can easily differentiate between these terms and identify the B terms. Once they are identified, the B terms can be used to generate sync signals for receiver 14.

An important advantage of the encoding scheme presented herein is that the receiver can selectively decode the signals at either the high original sampling rate, or at a lower sampling rate. For example, in FIG. 4, a receiver 14' is shown having a decoder 26' and D/A converter 28'. Instead of reconstructing series A, in this case the decoder 26' generates only the series A' formed of signals A1, A3, A5 . . . and the terms of B are ignored. These signals are fed to D/A converter 28' or another signal processor used to generate a signal A'(t). This signal is not as accurate a representation of the original signal A(t) generated by the converter 28 of FIG. 2 however in many instances it will be sufficient. Once again this process can be implemented without the use of expensive filtering networks.

The embodiments of FIG. 1–4 are described in terms of a signal broadcasting system, for example, for broadcasting FM signals. In this environment, receiver 14 is an expensive receiver used in a high end multichannel sound reproduction system where the quality of the sound produced is a crucial consideration. On the other hand, receiver 14' may be a low end portable receiver for which size, power consumption and price are more important then the quality of sound reproduction.

The encoding scheme is also applicable for sound recording on a cassette, a CD or a DVD. For sound recording and playback systems, the output of encoding circuit 20 is not transmitted to the receiver but instead, it is fed to a writing member 60 adapted to record the signals of the series A' and B on a recordable medium 64 such as a DVD disk.

In this latter case, the signals to be reproduced are not received directly from the transmitter but instead are detected by a playback device by reading the data at the high original rate or at a low rate (playback member 62') by skipping the terms of series B member 62 from the recording medium 64.

A practical example is now provided for the invention. In a recording studio for pressed media, such as CDs or DVDs using the subject invention, typical recording rates and playback rates are set forth below:

| Recording Rate (KHz) | Playback Rates (KHz) |
|---|---|
| 44.1 | 44.1, 22.05 |
| 48 | 48, 24 |
| 88 | 88, 44 |
| 96 | 96, 48 |
| 192 | 192, 96, 48 |

For the first four of these configurations, the initial series A is encoded to form series A', B as discussed above. For the lowest of these rates, 44.1, the low grade replay rate 22.05 may be too marginal but could still provide at least voice signals.

The highest of these frequencies (192 KHz) provides an abundance of samples so two different low rates could be derived from it. More specifically, the medium rate, 96 kHz can be derived in the normal manner. For the lower rate, the series A could be encoded into a series A" as follows:

| Series A: | A1 | A2 | A3 | A4 | A5 | A6 |   | A7 | A8 | A9 |   |
|---|---|---|---|---|---|---|---|---|---|---|---|
| Series B: |   | B1 | B2 | B3 |   | B4 |   | B5 | B6 |   |   |
| Series A': | A1 | B1 | A3 | B2 | A5 | B3 |   | A6 | B4 |   | (96 KHz) |
| Series A": | A1 | B1 | B2 | B3 | A5 | B4 |   | B5 | B6 | A9 | (48 KHz) | where for A", B1=A1–A2

B2=A3–A2; or =A3–A1

B3=A4–A3 . . . .

Figure 4:
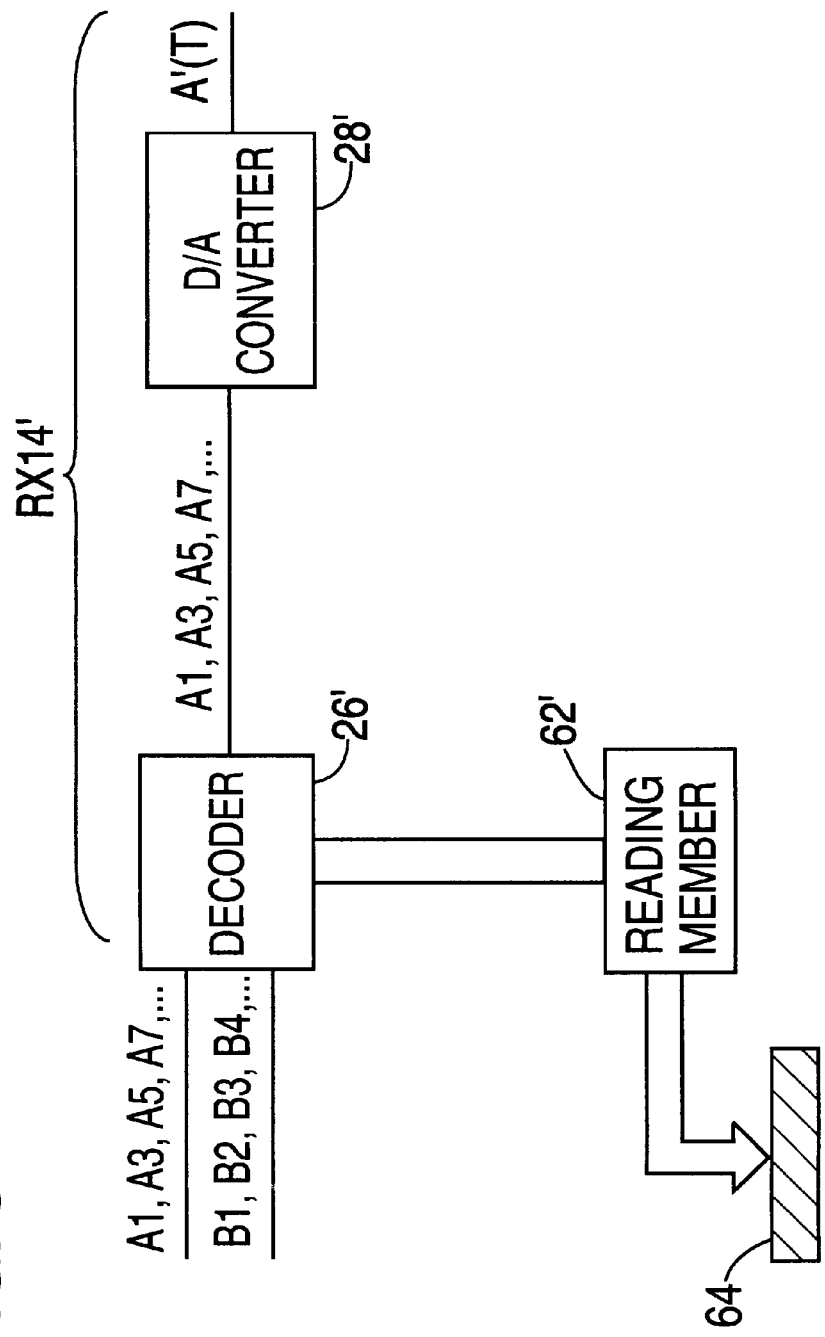
FIG. 4 shows a block diagram of a receiver or playback device in which only some of the recorded or transmitted signals are used to generate a lower quality signal.

Series A" can be recorded as a single channel or, on two channels, as shown in FIGS. 2 and 4 or on four channels.

Importantly, typically for high quality recordings each of the samples taken from A(t) are converted into twenty four bits. However, because musical recordings, especially from natural sources change relatively slowly, it is believed that eight bits may be sufficient for the signals of the B series. Therefore the encoding scheme presented herein is very efficient because it is self-compressing and therefore time consuming compression algorithm may be unnecessary.

Figure 5:
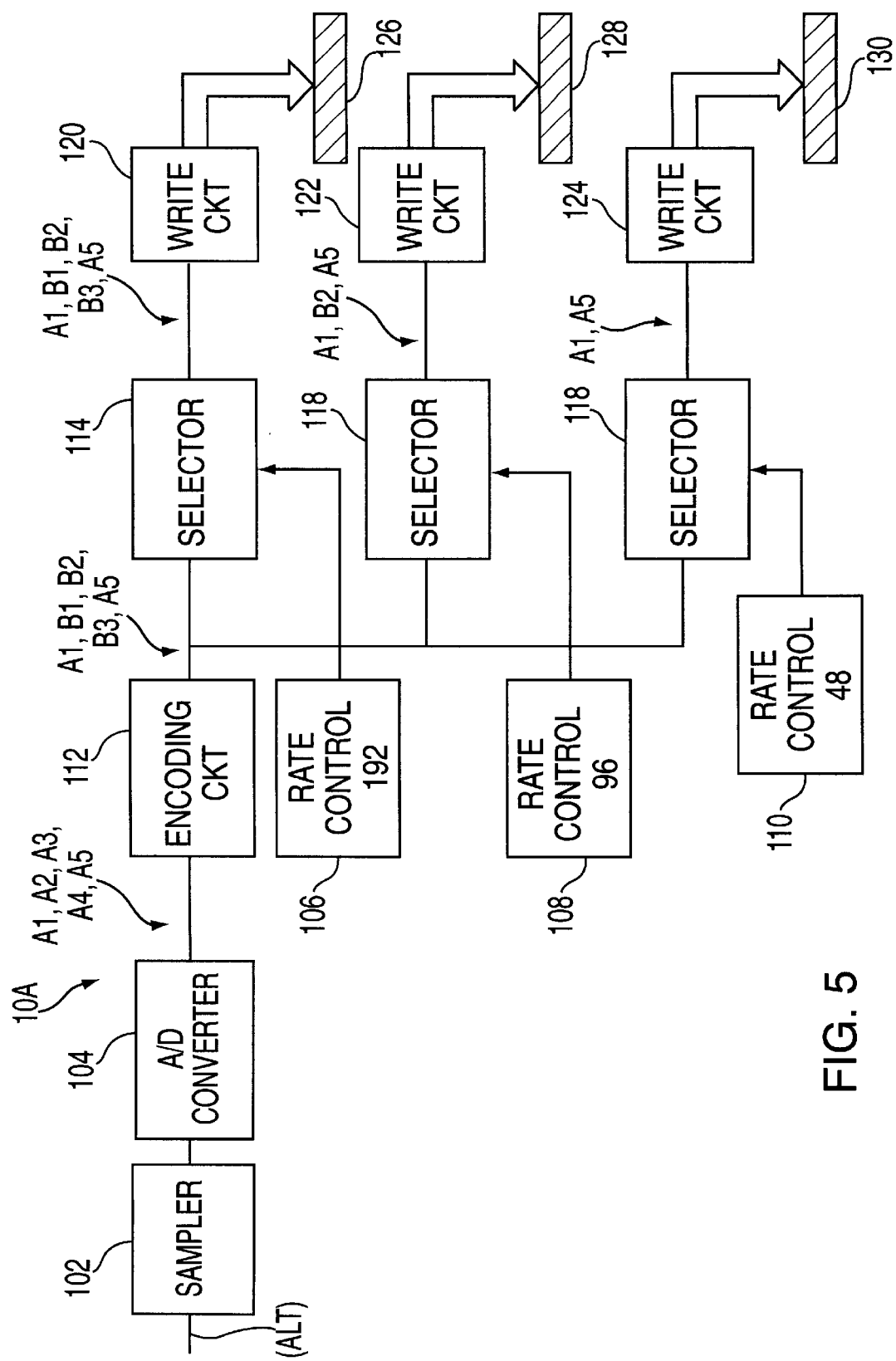
FIG. 5 shows a block diagram of an apparatus used to make simultaneous recordings at different rates and sound quality from a single high quality input signal.

In the embodiments discussed above, all the encoded information is transmitted to the receiver in a broadcasting environment, or recorded on a stamped media. In an alternate embodiment of the invention, several recordings at different sampling rates may be made by the apparatus 10A as shown in FIG. 5. Signal A(t), for example from a master recording, is sampled at 192 KHz by a sampler 102. The samples are fed to an A/D converter 104.

Apparatus 10A further includes three rate control circuits 106, 108, 110 for selecting the recordal rates, an encoder 112, three signal selector circuits 114, 116, 118 and three recording or writing circuits 120, 122, 124 for recording data on three media 126, 128, 130 respectively.

The encoding circuit 112 receives the signals A1 A2 A3 . . . from the analog to digital converter 104 and generates corresponding signals A1 B1 B2 B3 A5 B4 B5 B6 A9 . . . as defined above. The apparatus 10A is designed to produce recordings at three different rates. These rates are set by an operator in rate control circuits 106, 108 and 110. For example, rate control circuit 106 can be set to 192 KHz, rate control circuit 108 can be set to 96 KHz and rate control circuit 110 can be set to 48 KHz. Each of these rate control circuits is coupled to one of the selector circuits 114, 116, 118 which receive the signals generated by the encoder 112. In response to a control input from the respective rate control circuit, each of the selector circuits then selects the appropriate signals from the series of signals received from the encoder 112 for recording or writing on one the mediums. More particularly, selector 114 selects all the signals of the series and transmits them to write circuit 120. This circuit then writes all the signals on medium 126. As a result, the medium 126 contains a high quality recording since its contents can be used to recreate every one of the samples A1, B1, B2, B3, A5 . . . , as explained above.

The selector 116 selects only every second signal of the series from the encode 112, i.e., signals A1, B2, A5, B5 . . . . These signals are fed to write circuit 122 which records them on a medium 128. Since the signals recorded on this latter medium can be used to recreate only every second sampled signal, i.e., A1, A3, A5 . . . , this medium contains a medium quality recording.

Finally, selector 118 selects only every fourth signal from the series generated by decoder 112, i.e., A1, A5, A9 . . . and sends these to write circuit 124 for recordal on medium 130. Accordingly, medium 130 contains a low quality recording.

Obviously numerous modifications may be made to this invention without departing from its scope as set forth in the appended claims.

We claim:

1. A method of recording a series of input signals on a medium and replaying said signals from said medium at one of a high rate and a low rate comprising:

encoding said input series into a first series and a second series of signals, said first series of signals having terms selected from said input signals, with some of the terms from said input series being omitted from said first series, and said second series of signals having terms corresponding to a difference between one of said terms of said first series and an omitted term;

recording said two series of signals on said medium;

reading said two series of signals from said medium;

replaying said input signals at said high rate by combining said first and second series; and replaying said input signals at said low rate by omitting at least some of the terms of said second series.

2. The method of recording of claim 1 wherein said input series is encoded into said first series by selecting alternate terms of said first series.

3. The method of recording of claim 2 wherein said second series is selected by defining terms which correspond to the difference between a selected term of said first series and an adjacent term.

4. A method of recording an analog signal on several media simultaneously comprising:

converting said analog signal into a corresponding input series of digital signals;

encoding said input series by generating a first series of signals by selecting some terms from said input series with some terms of said input series being excluded from said first series and by generating a second series of signals by generating terms corresponding to a difference between two terms of said input signals, at least one said two terms being excluded from said first series;

combining said first and second series into a first output series including all the terms of said first and second series;

generating a second output series from at least said first series of signals; and recording said first and second output series respectively on a first and second medium.

5. The method of claim 4 wherein said second output series includes only terms from said first series, further comprising:

generating a third output series including terms from said first series and only some terms from said second series; and recording said third output series on a third medium.

* * * * *